(12) United States Patent (10) Patent No.: US 9,114,554 B2
Mironov (45) Date of Patent: Aug. 25, 2015

(54) WIND TURBINE BLADE MOULD

(75) Inventor: Gabriel Mironov, Montreal (CA)

(73) Assignee: Suzhou Red Maple Wind Blade Mould Co., Ltd., Jiangsu (CN)

( * ) Notice: Subject to any disclaimer, the term of this patent is extended or adjusted under 35 U.S.C. 154(b) by 730 days.

(21) Appl. No.: 13/255,925

(22) PCT Filed: Mar. 12, 2010

(86) PCT No.: PCT/IB2010/051078
§ 371 (c)(1),
(2), (4) Date: Jan. 3, 2012

(87) PCT Pub. No.: WO2010/103493
PCT Pub. Date: Sep. 16, 2010

(65) Prior Publication Data
US 2012/0097333 A1 Apr. 26, 2012

(30) Foreign Application Priority Data

Mar. 13, 2009 (CN) ......................... 2009 2 006583 U

(51) Int. Cl.
*B29C 33/20* (2006.01)
*B29C 33/00* (2006.01)
*B29C 33/30* (2006.01)
*B29L 31/08* (2006.01)

(52) U.S. Cl.
CPC ........... *B29C 33/0011* (2013.01); *B29C 33/308* (2013.01); *B29L 2031/082* (2013.01)

(58) Field of Classification Search
CPC .................................................... B29C 33/308

USPC ...................... 425/451.9, DIG. 238
See application file for complete search history.

(56) References Cited

U.S. PATENT DOCUMENTS

| 3,927,855 A | 12/1975 | Kleinhagauer |
| 4,504,343 A * | 3/1985 | Green ........................... 156/177 |
| 2004/0043680 A1 * | 3/2004 | Mead ............................... 441/74 |
| 2006/0034971 A1 * | 2/2006 | Olsen et al. ................. 425/451.5 |
| 2011/0020131 A1 * | 1/2011 | Petersen et al. ................ 416/226 |

FOREIGN PATENT DOCUMENTS

| CN | 2415905 Y | 1/2001 |
| CN | 1857823 A | 11/2006 |
| CN | 101318212 A | 12/2008 |
| CN | 201357528 Y | 12/2009 |
| JP | 5293856 A | 11/1993 |
| WO | WO2006/061089 A1 | 6/2006 |

OTHER PUBLICATIONS

The International Search Report in PCT/IB2010/051078 mailed Jul. 22, 2010.

* cited by examiner

*Primary Examiner* — Ryan Ochylski
(74) *Attorney, Agent, or Firm* — Novak Druce Connolly Bove + Quigg

(57) ABSTRACT

A wind turbine blade mold, comprising a mold shell and a metallic mold frame, wherein the mold is provided with stiffening ribs that are laminated or bonded to the mold shell, characterized in that the stiffening ribs being oriented in the spanwise direction of the mold. The stiffening ribs comprises tubes that are bonded to the shell surface with fiberglass web lamination, thus forming a I-beam cross section. The mold may be provided with threaded shape adjustment devices. Using the mold, the deformation may be easily corrected.

4 Claims, 6 Drawing Sheets

WIND TURBINE BLADE MOULD

TECHNICAL FIELD

The present utility model relates to a wind turbine blade mould, particular to a wind turbine blade mould being able of shape adjustment.

BACKGROUND

In the past, blade producers often had problems with their mould shells suffering small deformations that increased with the number of blades produced, gradually becoming major errors in the blade shape. These deformations are caused by cycles of heating and cooling while the mould is under some pressure or load. Essentially the mould shell slowly becomes stretched out of shape as many blades are produced. This deformation overwhelmingly occurs in the cross section shape of the blade mould, as the two spanwise edges are normally supported by the sturdy steel backing frame.

Some early attempts to correct the mould cross chordwise shape failed because the importance of adding spanwise oriented elements such as the laminated stiffening tubes was not recognized. Accordingly, the zone of induced deformation around each adjustment point was small in size and roughly circular in shape. It was found that an excessively small spacing of adjustment points in the spanwise direction was required to obtain a useful shape correction, and the whole effort at adjustment became expensive and complicated, finally unworkable.

Other early attempts to maintain the mould shape failed because the stiffening elements were aligned in the cross chordwise plane, rather than spanwise, e.g. as bulkheads made from wood, steel, etc. In some cases such bulkheads were also retained with threaded supports, giving some measure of adjustability. However such bulkheads only served to maintain the mould shape for a short distance in the spanwise direction, and the sections between each bulkhead were substantially unsupported. After long use, mould with such stiffening systems take on an unsatisfactory 'corrugated' appearance, owing to the sagging and unrecoverable deformation which inevitably occurs between each bulkhead.

SUMMARY

The present utility model aims to provide a wind turbine mould that can correct the cross sectional deformations by applying specifically designed adjustable supports and spanwise stiffening rib on the mould, which construction can be adjusted to push or pull the mould shell back into shape.

These supports are arranged in a novel manner, by attachment to the stiffening rib, so that their effect in adjusting the cross section shape can be propagated a great distance in the spanwise direction. This is achieved by the non-uniform stiffening effect of the laminated tube construction, which achieves an I-Beam effect in the spanwise direction but has very little influence on deformation in the cross section direction. This makes it possible to correct defects in the cross section shape of the mould with a relatively limited number of adjustment points, arranged at spacing of each 1-4 meters in the spanwise direction.

Thus, the present utility model increases the dimensional accuracy and lifetime by allowing easy adjustment of the surface shape of the mould.

A wind turbine blade mould is provided, comprising a mould shell and a metallic mould frame, wherein the mould is provided with stiffening ribs that are laminated or bonded to the mould shell, characterized in that the stiffening ribs being oriented in the spanwise direction of the mould.

According to a preferred embodiment, the stiffening ribs comprises tubes that are bonded to the shell surface with fiberglass web lamination, thus forming a I-beam cross section.

According a preferred embodiment, the mould is provided with center shape adjustment devices, which are provided at the shell surface and provide adjustments only perpendicular to the shell surface, and flange shape adjustment devices, which are provided at the spanwise flanges of the mould and provide adjustments both perpendicular to and parallel with the shell surface, the center shape adjustment devices and the flange shape adjustment devices connecting the stiffening ribs with the mould frame.

According to a preferred embodiment, the center shape adjustment devices and the flange shape adjustment devices comprise threaded adjustment devices.

BRIEF DESCRIPTION OF DRAWINGS

The present utility model will now be described in detail by way of non-limiting example and with reference to the accompanying drawings, wherein.

Like parts are designated with like reference numerals throughout the drawings.

PREFERRED EMBODIMENT

The mould according to the present utility model comprises a mould shell 20 and a metallic mould frame. The mould shell 20 is first laminated to a suitable thickness and strength, say about 25 mm of layered glass fiber/epoxy material. A core material such as foam, balsa wood, or honeycomb may be added inside the laminate in order to increase the strength and resistance to deformation. In a particularly preferred configuration, the shell 20 is laminated as 12-15 mm of glass/epoxy material on the working surface, followed by 25 mm of balsa core, then followed by 6-8 mm of glass/epoxy material on the back side.

Figure 5:
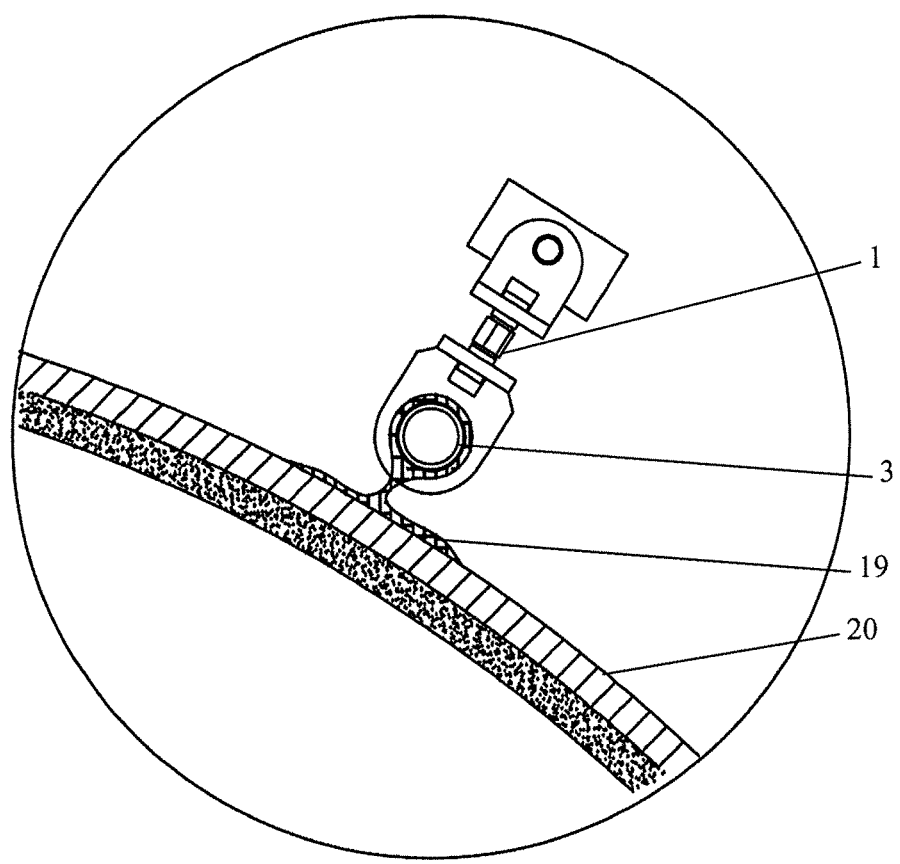
FIG. 5 is an enlarged view showing the mould shell, the stiffening rib, the center shape adjustment device according to the present utility model.
Figure 6:
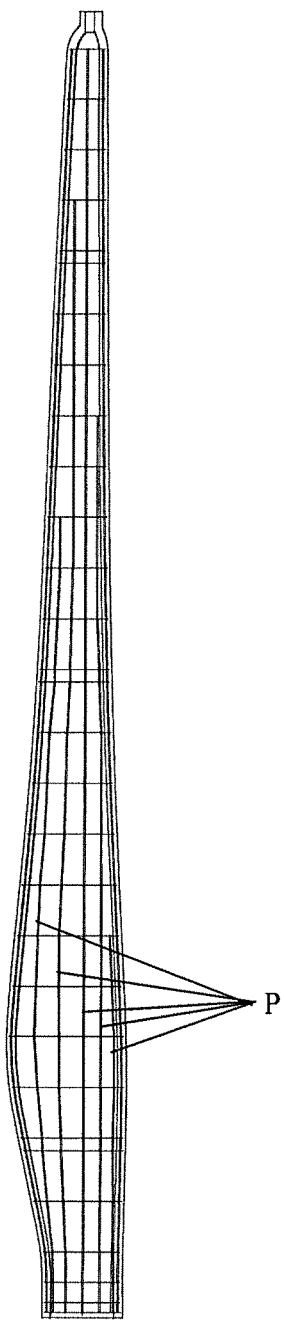
FIG. 6 is a schematic view showing the positions of the stiffening rib on the mould shell.

According to the present utility model, the shell 20 of the mould should be stiffened with stiffening ribs running spanwise, rather than chordwise. Few or no chordwise ribs should be fixed. Stiffening ribs are provided as 40-75 mm diameter steel tubes 3 with 1.5-3 mm wall thickness, supported with a gap of approximately 20-60 mm between tube and mould surface. The optimum tube diameter, wall thickness, and gap are depending on the local curvature of the mould, in that the size chosen must allow for convenient forming of the tube to the mould shape. These tubes are then laminated to the back of the mould surface with, further composite material, such as fiberglass web lamination 19, in order to be securely fixed in place. As best seen in FIG. 5, the whole construction of the steel tube 3, joining material, and mould shell 20 itself takes on the aspect of an I-beam in the cross sectional view, imparting excellent stiffness in the direction along the tube length (spanwise), but very little additional stiffness in the direction transverse to the tube length (chordwise). FIG. 6 schematically shows the positions P of the stiffening ribs.

Figure 1:
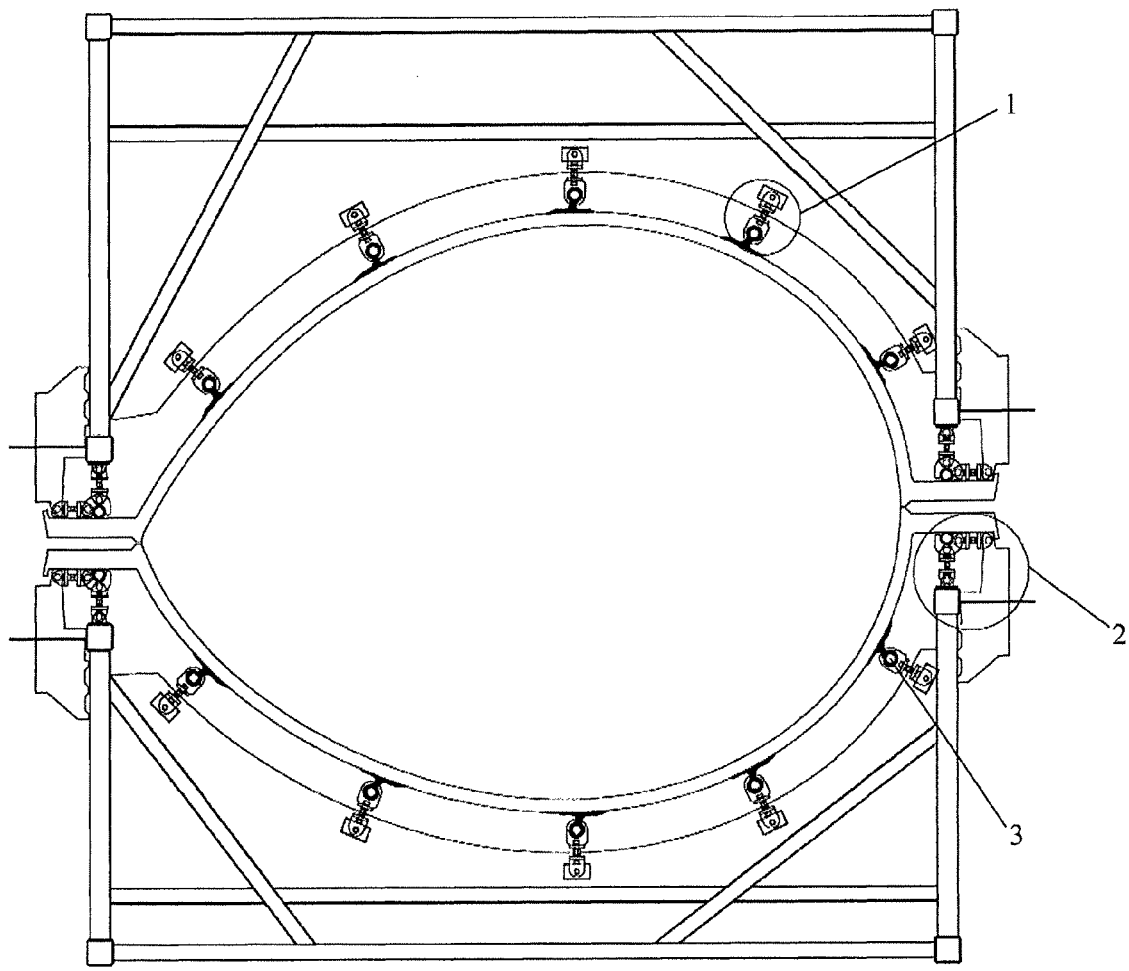
FIG. 1 is an end view showing the mould with center shape adjustment devices and flange shape adjustment device according to the present utility model.

FIG. 1 shows that the mould is provided with center shape adjustment devices 1, which are provided at the shell surface and provide adjustments only perpendicular to the shell surface, and flange shape adjustment devices 2, which are provided at the spanwise flanges of the mould and provide adjustments both perpendicular to and parallel with the shell surface, and thus can be used to alter the width of the mould in the chordwise direction, the center shape adjustment devices and the flange shape adjustment devices connecting the stiffening ribs with the mould frame. The number of the center shape adjustment devices 1 corresponds to that of the stiffening ribs provided on the surface of the mould shell. The number of the flange shape adjustment devices 2 corresponds to that of the stiffening ribs provided on the flange of the mould. The stiffening ribs are joined to the mould frame by means of the center shape adjustment devices 1 and the flange shape adjustment devices 2, both of which uses double ended threaded adjustment rods, so attached that they may pivot freely at each end, thus providing push-pull force to the mould surface or the mould flange, and little restraint in the tangential direction. Such rods are threaded with left hand thread on one end, and right hand thread on the other, in the manner of a turnbuckle. This free movement is important in consideration of thermal expansion of the mould shell during heating and cooling parts of the moulding cycle. A preferred size of the adjustment rod is with threads of M12-M24, and with length of about 75 mm-200 mm.

Figure 2:
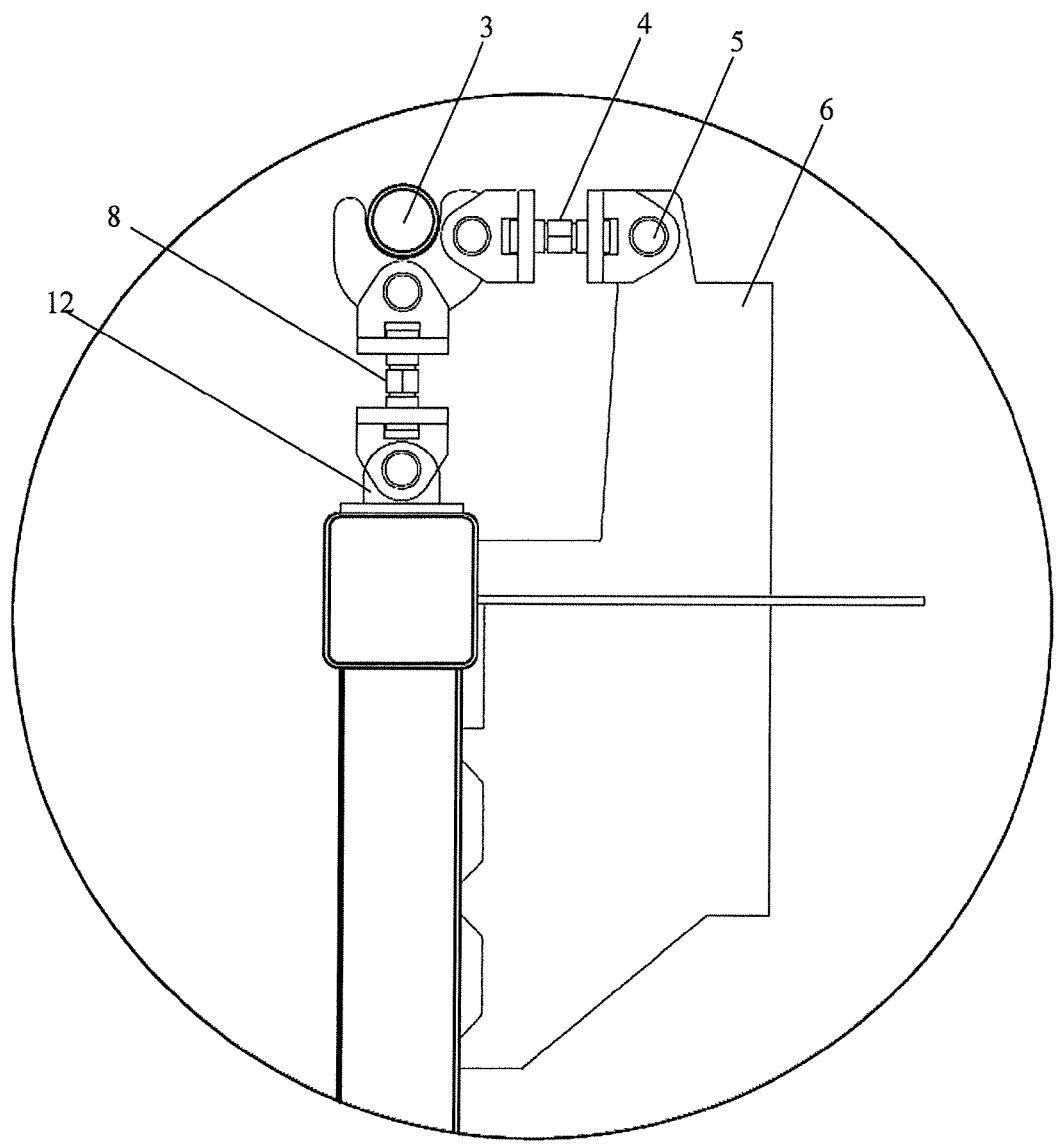
FIG. 2 is an enlarged view showing the flange shape adjustment device according to the present utility model.
Figure 3:
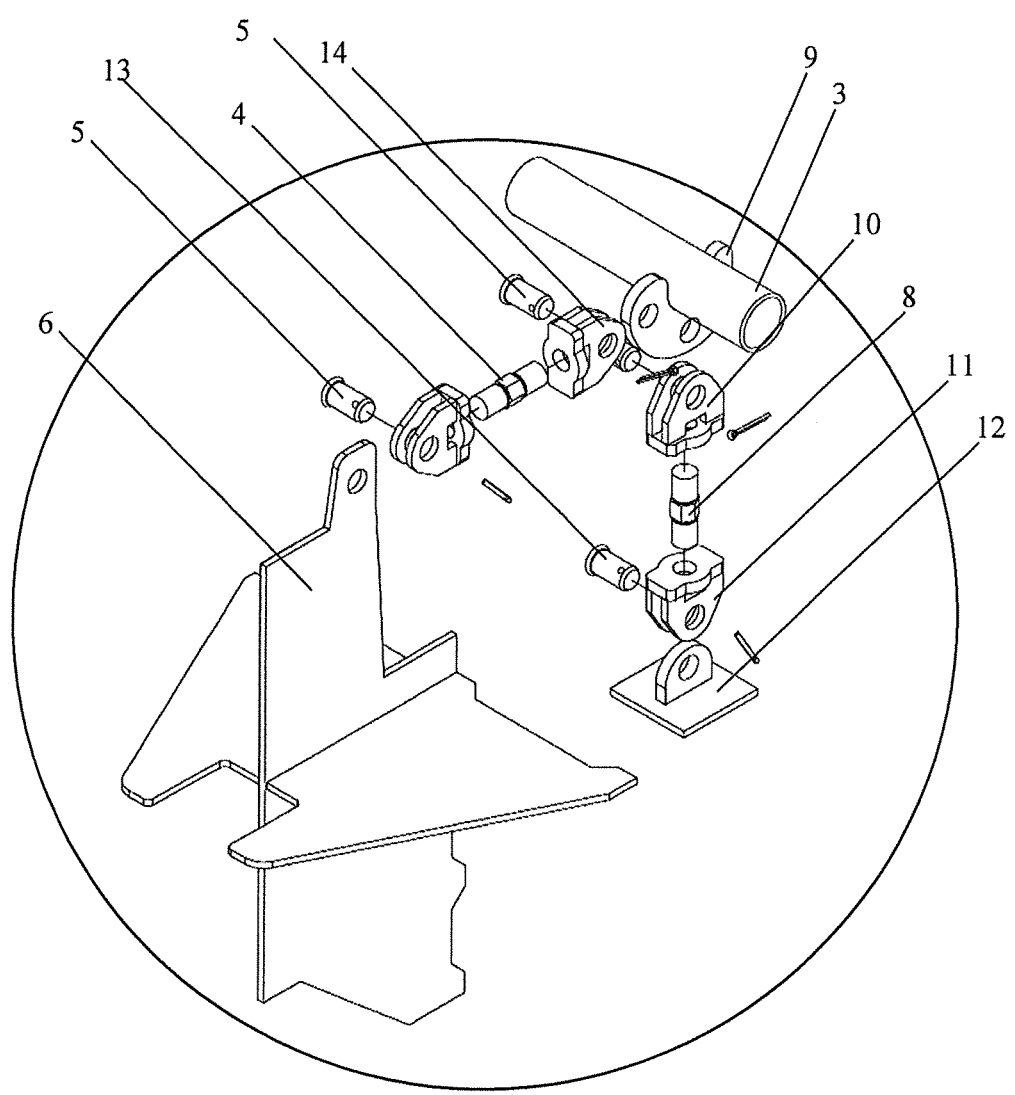
FIG. 3 is an exploded view showing the flange shape adjustment device according to the present utility model.
Figure 4:
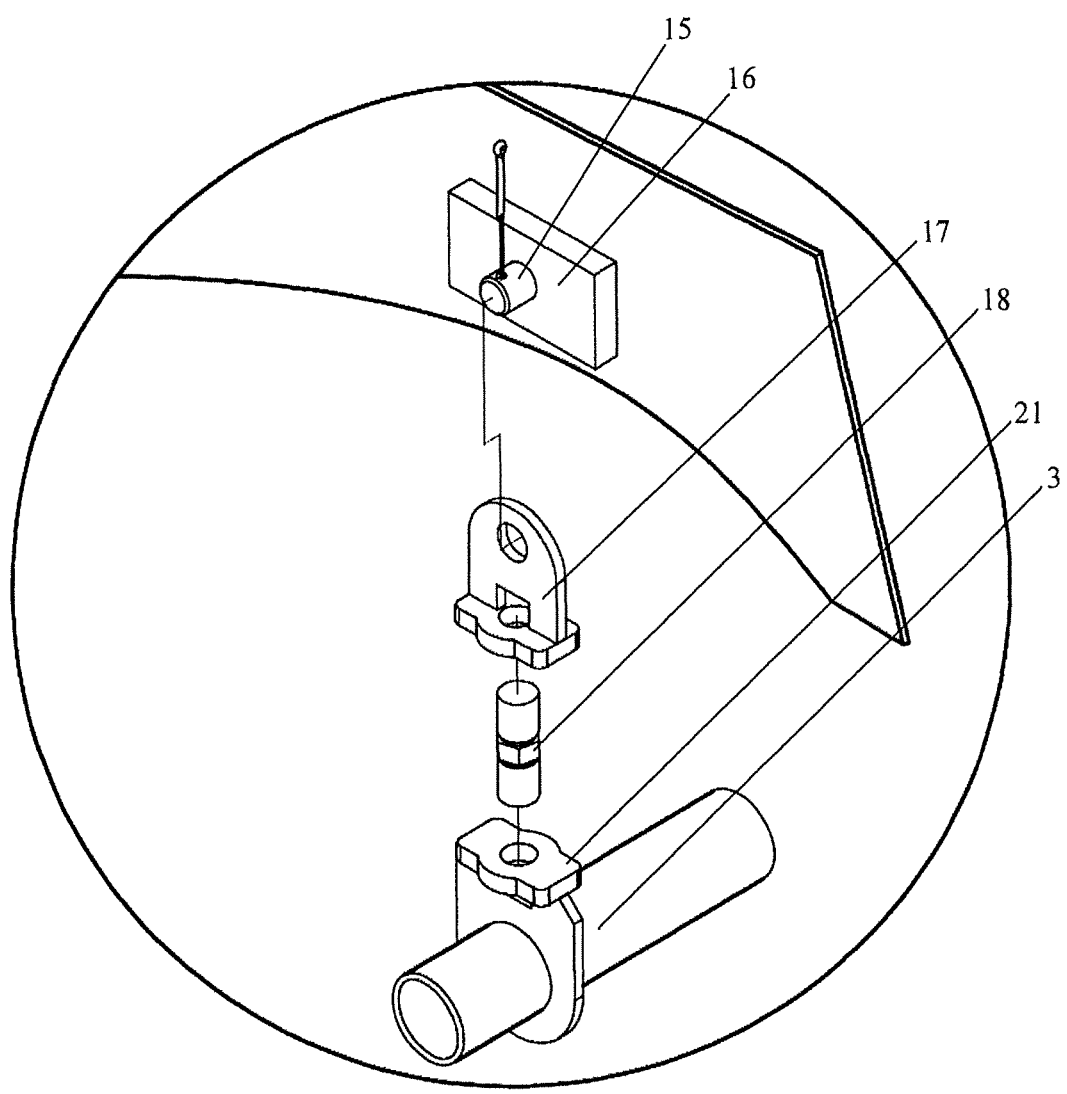
FIG. 4 is an enlarged and exploded view showing a portion of the center shape adjustment device according to the present utility model.

Now, the center shape adjustment devices 1 and the flange shape adjustment devices 2 will be described in detail with reference to FIGS. 2-4.

Firstly, the flange shape adjustment devices 2 will be described. The flange shape adjustment devices 1 consists of a parallel motion adjusting device and a perpendicular motion adjusting device. Both the parallel motion adjusting device and the perpendicular motion adjusting device are connected to a C-shaped bearing plate 9 which is welded to the tube 3. The perpendicular motion adjusting device is mounted on the mould flange by means of a base plate 12. The parallel motion adjusting device is fixed to a mounting plate 6 which is fixed to the mould frame. The parallel motion adjusting device comprises: a pair of pivot plate 14, one of which is connected to the C-shape bearing plate 9 by a pivot pin 5, the other of which is connected to the mounting plate 6 by another pivot pin 5; and a threaded bar 4 connected between the pair of pivot plates 14. The structure of the perpendicular motion adjusting device is similar to that of the parallel motion adjusting device. The perpendicular motion adjusting device comprises; an upper pivot plate 10, which is connected to the C-shape bearing plate 9 by a pivot pin; a lower pivot plate 11, which is connected to the base plate 12 by another pivot pin 13; and a threaded bar 8 connected between the upper and lower pivot plates 10, 11.

Next, the center shape adjustment devices 1 will be described. The center shape adjustment devices 1 consists of only a perpendicular motion adjusting device. The perpendicular motion adjusting device comprises: an upper pivot plate 17, which is connected to an upper strengthening plate 16 by an upper pivot pin 15; a lower pivot plate 21 which is fixed to a bearing plate of the tube 3; and a threaded bar 18 which connect the upper pivot plate 17 with the lower pivot plate 21.

Other embodiments are conceivable, with single end threaded adjustment rods, adjustment tubes with female rather than male threads, or even hydraulic cylinders in place of the adjustment rods.

Within the scope and spirit of the present utility model, one skilled in the art will understand that various changes and modifications can be made.

The invention claimed is:

1. A wind turbine blade mould, comprising a mould shell and a metallic mould frame, wherein the mould is provided with stiffening ribs that are laminated or bonded to the mould shell, characterized in that the stiffening ribs are oriented in the spanwise direction of the mould, and with center shape adjustment devices, which are provided at the shell surface and provide adjustments only perpendicular to the shell surface, and flange shape adjustment devices, which are provided at the spanwise flanges of the mould and provide adjustments both perpendicular to and parallel with the shell surface, the center shape adjustment devices and the flange shape adjustment devices connecting the stiffening ribs with the mould frame.

2. The mould of claim 1, wherein the stiffening ribs comprise tubes that are bonded to the shell surface with fiberglass web lamination, thus forming an I-beam cross section.

3. A wind turbine blade mould, comprising a mould shell and a metallic mould frame, wherein the mould is provided with stiffening ribs that are laminated or bonded to the mould shell, characterized in that the stiffening ribs are oriented in the spanwise direction of the mould, and with center shape adjustment devices, which are provided at the shell surface and provide adjustments only perpendicular to the shell surface, and flange shape adjustment devices, which are provided at the spanwise flanges of the mould and provide adjustments both perpendicular to and parallel with the shell surface, the center shape adjustment devices and the flange shape adjustment devices connecting the stiffening ribs with the mould frame, and wherein the center shape adjustment devices and the flange shape adjustment devices comprise threaded adjustment devices.

4. The mould of claim 3, wherein the stiffening ribs comprise tubes that are bonded to the shell surface with fiberglass web lamination, thus forming an I-beam cross section.

* * * * *